(12) United States Patent
Wan et al.

(10) Patent No.: US 9,565,010 B2
(45) Date of Patent: Feb. 7, 2017

(54) METHOD AND APPARATUS FOR HANDLING INTER-CELL INTERFERENCE

(71) Applicant: HUAWEI TECHNOLOGIES CO., LTD., Shenzhen (CN)

(72) Inventors: Lei Wan, Beijing (CN); Xinrui Feng, Beijing (CN); Yong Wu, Beijing (CN); Jianqin Liu, Beijing (CN); Wei Sun, Beijing (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 237 days.

(21) Appl. No.: 14/100,281

(22) Filed: Dec. 9, 2013

(65) Prior Publication Data
US 2014/0098783 A1    Apr. 10, 2014

Related U.S. Application Data

(63) Continuation of application No. PCT/CN2012/076703, filed on Jun. 11, 2012.

(30) Foreign Application Priority Data

Jun. 9, 2011  (CN) .......................... 2011 1 0154192

(51) Int. Cl.
*H04W 4/00*    (2009.01)
*H04L 5/00*    (2006.01)
(Continued)

(52) U.S. Cl.
CPC ........... *H04L 5/0073* (2013.01); *H04L 5/0026* (2013.01); *H04W 72/046* (2013.01); *H04W 16/28* (2013.01)

(58) Field of Classification Search
CPC ............. H04W 72/0446; H04W 88/08; H04W 72/0453
See application file for complete search history.

(56) References Cited

U.S. PATENT DOCUMENTS 6,097,970 A * 8/2000 Angus .................. H04W 16/00
                                                        455/561
6,311,075 B1 * 10/2001 Bevan ................... H01Q 1/246
                                                        342/368
(Continued)

FOREIGN PATENT DOCUMENTS

CN       102074802 A     5/2011
CN       102082615 A     6/2011
(Continued)

OTHER PUBLICATIONS

International Search Report mailed Sep. 20, 2012 in corresponding International Application No. PCT/CN2012/076703.
(Continued)

*Primary Examiner* — Hassan Phillips
*Assistant Examiner* — Siren Wei
(74) *Attorney, Agent, or Firm* — Staas & Halsey LLP

(57) ABSTRACT

The present invention discloses a method including: obtaining downtilt coordination information of a local cell and downtilt coordination information of a neighbor cell; and setting, according to the downtilt coordination information of the local cell and the downtilt coordination information of the neighbor cell, a downtilt of a time-frequency resource block on an antenna of the local cell with respect to a to-be-coordinated user equipment. The downtilt coordination information of the local cell and that of the neighbor cell are referenced to for setting the downtilt of the time-frequency resource block on the antenna of the local cell with respect to the to-be-coordinated user equipment, which avoids interference on user equipments within a service range of the neighbor cell while ensuring signal received power and SINR experience for user equipments within a service range of the local cell.

20 Claims, 4 Drawing Sheets

(51) Int. Cl.
*H04W 72/04* (2009.01)
*H04W 16/28* (2009.01)

(56) References Cited

U.S. PATENT DOCUMENTS

| | | | |
|---|---|---|---|
| 6,487,416 B1* | 11/2002 | Bundy | H01Q 1/1257 342/374 |
| 7,031,266 B1* | 4/2006 | Patel | H04L 45/02 370/254 |
| 2007/0132639 A1* | 6/2007 | Korneluk | G01S 19/252 342/464 |
| 2007/0201350 A1* | 8/2007 | Papasakellariou | H04L 5/023 370/208 |
| 2008/0096566 A1* | 4/2008 | Brunner | C07D 491/04 455/437 |
| 2009/0146903 A1* | 6/2009 | Ownbey | H01Q 1/246 343/872 |
| 2010/0124918 A1* | 5/2010 | Agashe | H04W 36/0083 455/423 |
| 2011/0103504 A1* | 5/2011 | Ma | H04B 7/0417 375/267 |

FOREIGN PATENT DOCUMENTS

| | | | |
|---|---|---|---|
| EP | 1 307 066 A2 | 5/2003 | |
| EP | 1307066 A2 * | 5/2003 | ......... H04W 72/082 |
| EP | 2 299 749 A2 | 3/2011 | |
| WO | 99/17576 | 4/1999 | |
| WO | 03/083992 A1 | 10/2003 | |
| WO | 2010/118515 A1 | 10/2010 | |
| WO | 2011/037501 A1 | 3/2011 | |

OTHER PUBLICATIONS

International Search Report issued Sep. 20, 2012, in corresponding International Patent Application No. PCT/CN2012/076703.
Extended European Search Report issued Feb. 11, 2014, in corresponding European Patent Application No. 12796362.7.

* cited by examiner

METHOD AND APPARATUS FOR HANDLING INTER-CELL INTERFERENCE

CROSS-REFERENCE TO RELEVANT APPLICATIONS

This application is a continuation of International Application No. PCT/CN2012/076703, filed on Jun. 11, 2012, which claims priority to Chinese Patent Application No. 201110154192.8, filed on Jun. 9, 2011, both of which are hereby incorporated by reference in their entireties.

TECHNICAL FIELD

The present invention relates to the field of communications, and in particular, to a method and an apparatus for handling inter-cell interference.

BACKGROUND

As shown in FIG. 1, a downtilt is a direction of an antenna vertical main beam. Generally, when the downtilt of an antenna is aligned to a UE (User Equipment, user equipment), the UE has a best signal received power and best signal received quality.

At present, an AAS (Active Antenna System, active antenna system) is capable of electrically adjusting a downtilt in milliseconds based on subcarriers, which may align a downtilt on each time-frequency resource block of an antenna to a target UE, to improve a signal received power and enhance signal received quality of the target UE.

However, as shown in FIG. 2, when UEs are distributed evenly in terms of geographical location, elevation angles of most UEs are smaller than a downtilt that is set for each cell antenna which uses the same downtilt. In order to align the downtilt set on each time-frequency resource block of an antenna to a target UE, the downtilt set by the AAS system will make a vertical beam on each time-frequency resource block to further point to a cell edge. Hence, in a co-frequency networking system, an interfering power of a local cell on signals of UEs in a neighbor cell increases, which affects SINR (Signal-to-Interference Plus Noise Ratio, signal-to-interference-plus-noise ratio) experience of UEs in the cells.

SUMMARY

In order to solve the above problem and achieve the purpose of avoiding interference on a UE in a neighbor cell while ensuring the received signal strength of a UE in a local cell, embodiments of the present invention provide a method and an apparatus for handling inter-cell interference. The technical solutions are as follows.

A method for handling inter-cell interference, where the method includes:

obtaining downtilt coordination information of a local cell and downtilt coordination information of a neighbor cell; and setting, according to the downtilt coordination information of the local cell and the downtilt coordination information of the neighbor cell, a downtilt of a time-frequency resource block on an antenna of the local cell with respect to a to-be-coordinated user equipment; where either downtilt coordination information of the downtilt coordination information of the local cell and the downtilt coordination information of the neighbor cell includes any one or more of: optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block of the base station of the cell is assigned to different user equipments, and downtilts not recommended for time-frequency resource blocks on an antenna of a neighboring cell.

An apparatus for handling inter-cell interference, where the apparatus includes an obtaining module and a setting module, where the obtaining module is configured to obtain downtilt coordination information of a local cell and downtilt coordination information of a neighbor cell, where either downtilt coordination information of the downtilt coordination information of the local cell and the downtilt coordination information of the neighbor cell includes one or more of: optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block of the base station of the cell is assigned to different user equipments, and downtilts not recommended for time-frequency resource blocks on an antenna of a neighboring cell; and the setting module is configured to set, according to the downtilt coordination information of the local cell and the downtilt coordination information of the neighbor cell obtained by the obtaining module, a downtilt of a time-frequency resource block on an antenna of the local cell with respect to a to-be-coordinated user equipment.

The benefits provided by the technical solutions according to the embodiments of the present invention are that: by implementing the technical solutions of obtaining downtilt coordination information of a local cell and downtilt coordination information of a neighbor cell, and then setting, according to the downtilt coordination information of the local cell and the downtilt coordination information of the neighbor cell, a downtilt of a time-frequency resource block on an antenna of the local cell with respect to a to-be-coordinated user equipment, the downtilt coordination information of the local cell and that of the neighbor cell are referenced to for setting the downtilt of the time-frequency resource block on the antenna of the local cell with respect to the to-be-coordinated user equipment, which avoids interference on user equipments within a service range of the neighbor cell while ensuring a signal received power and SINR experience for user equipments within a service range of the local cell.

DESCRIPTION OF EMBODIMENTS

To make the objectives, technical solutions, and advantages of the present invention more comprehensible, the following further describes the embodiments of the present invention in detail with reference to the accompanying drawings.

Figure 3:
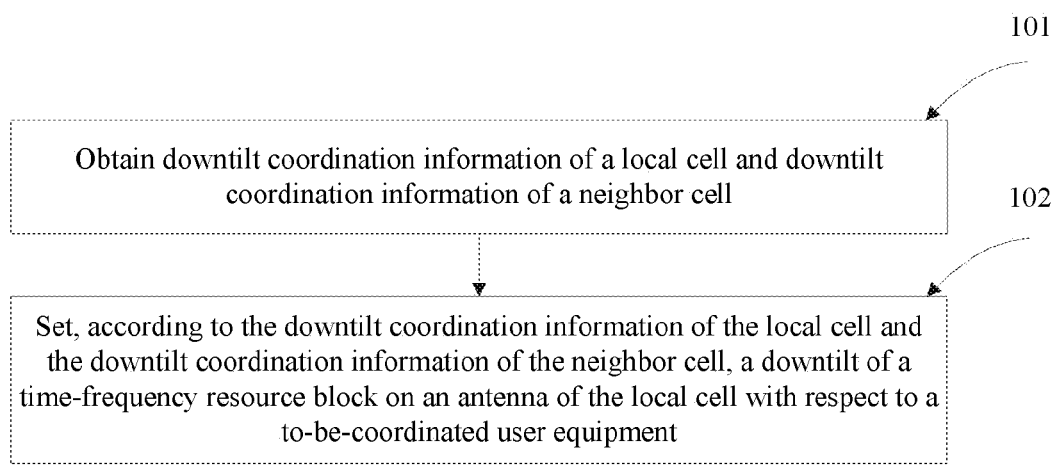
FIG. 3 is a flowchart of a method for handling inter-cell interference according to an embodiment of the present invention.

Referring to FIG. 3, an embodiment of the present invention provides a method for handling inter-cell interference. The executing entities of the method include a serving base station or a network node, and the embodiment of the present invention sets no specific limit thereto. The method includes the following:

Step 101: Obtain downtilt coordination information of a local cell and downtilt coordination information of a neighbor cell.

Step 102: Set, according to the downtilt coordination information of the local cell and the downtilt coordination information of the neighbor cell, a downtilt of a time-frequency resource block on an antenna of the local cell with respect to a to-be-coordinated user equipment.

Either downtilt coordination information of the downtilt coordination information of the local cell and the downtilt coordination information of the neighbor cell includes any one or more of: optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block of the base station of the cell is assigned to different user equipments, and downtilts not recommended for time-frequency resource blocks on an antenna of a neighboring cell.

By implementing the technical solution of obtaining downtilt coordination information of a local cell and downtilt coordination information of a neighbor cell, and then setting, according to the downtilt coordination information of the local cell and the downtilt coordination information of the neighbor cell, a downtilt of a time-frequency resource block on an antenna of the local cell with respect to a to-be-coordinated user equipment, the downtilt coordination information of the local cell and that of the neighbor cell are referenced to for setting the downtilt of the time-frequency resource block on the antenna of the local cell with respect to the to-be-coordinated user equipment, which avoids interference on user equipments within a service range of the neighbor cell while ensuring signal received powers and SINR experience for user equipments within a service range of the local cell.

Figure 4:
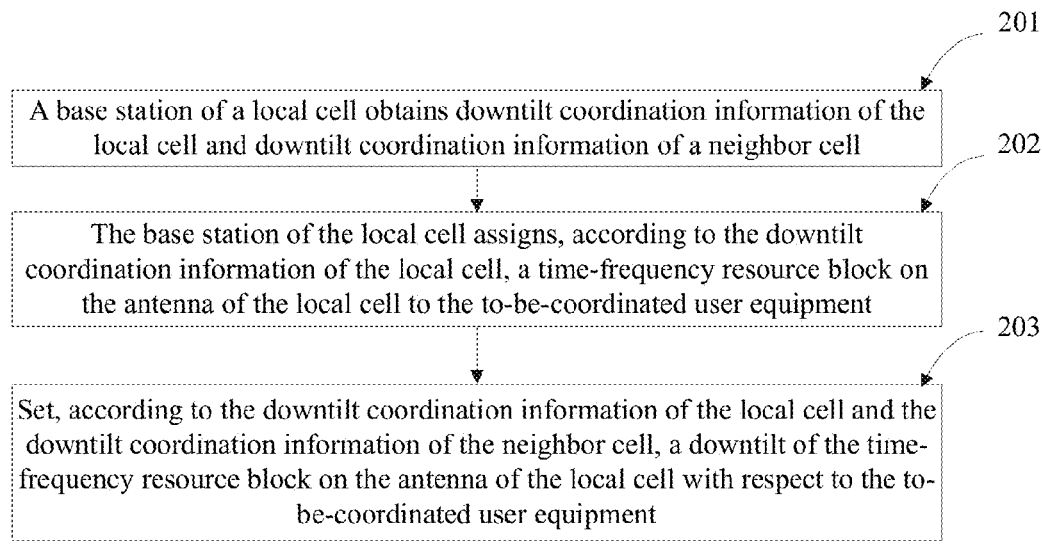
FIG. 4 is a flowchart of another method for handling inter-cell interference according to an embodiment of the present invention.

The method for handling inter-cell interference is described in detail as follows. The executing entities of the method include a serving base station or a network node, and the embodiment of the present invention sets no specific limit thereto. The embodiment of the present invention presents the related description by using a base station as an executing entity of the method. Referring to FIG. 4, the specific method is as follows.

Step 201: A base station of a local cell obtains downtilt coordination information of the local cell and downtilt coordination information of a neighbor cell.

Either downtilt coordination information of the downtilt coordination information of the local cell and the downtilt coordination information of the neighbor cell includes any one or more of: optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block of the base station of the cell is assigned to different user equipments, and downtilts not recommended for time-frequency resource blocks on an antenna of a neighboring cell.

In particular, this step specifically includes the following operations.

Step 201-1: The base station of the local cell obtains the downtilt coordination information of the local cell, where the downtilt coordination information of the local cell includes: optimal downtilt information of time-frequency resource blocks on the antenna of the local cell with respect to user equipments within a service range of the local cell, location information of user equipments within the service range of the local cell, location information of the base station of the local cell, use probabilities of downtilts on each time-frequency resource block on the antenna of the local cell, probabilities that each time-frequency resource block of the base station of the local cell is assigned to different user equipments, and downtilts not recommended for time-frequency resource blocks on an antenna of a neighboring cell.

Obtaining, by the base station of the local cell, the optimal downtilt information of time-frequency resource blocks on the antenna of the local cell with respect to user equipments within the service range of the local cell includes the following operations.

Step 201-1-1: The base station of the local cell obtains a DOA (direction of arrival) information of a user equipment within the service range of the antenna of the local cell, where the DOA parameter at least includes downtilt information of a time-frequency resource block on the antenna of the local cell with respect to user equipments within the service range of the local cell. In the embodiment of the present invention, the DOA parameter may also include azimuth angle information of a time-frequency resource block on the antenna of the local cell with respect to user equipments within the service range of the local cell.

Figure 5:
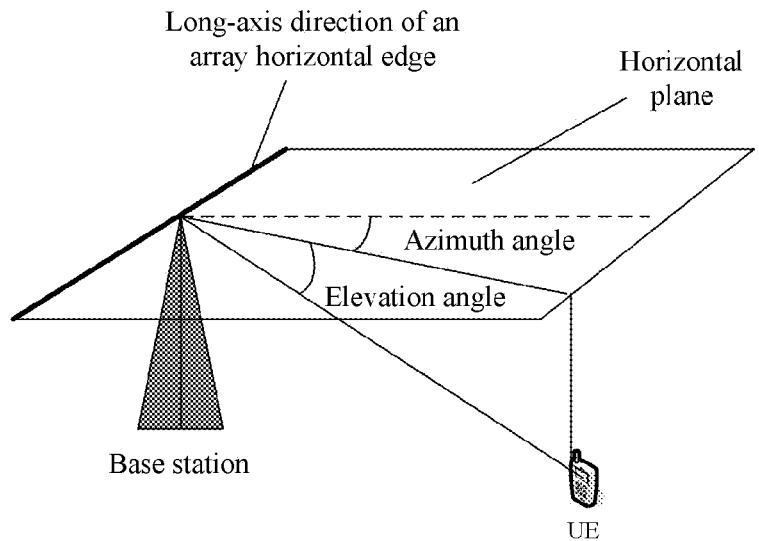
FIG. 5 is a schematic DOA diagram of a user equipment according to an embodiment of the present invention.
Figure 6:
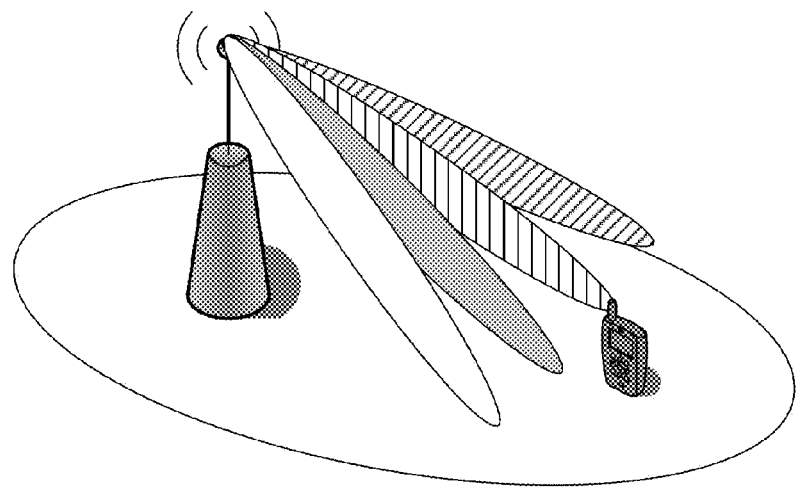
FIG. 6 is a schematic diagram of a method for measuring a three-dimensional pre-code matrix according to an embodiment of the present invention.

Referring to FIG. 5 which is a schematic DOA (direction of arrival) diagram of a user equipment, an azimuth angle is an angle between a projection of the direction of arrival on a horizontal plane and a forward sighting direction of the antenna of the local cell. An array in the figure illustrates an antenna array of a base station.

The DOA information of a user equipment may be obtained in one of the following three modes.

Mode 1: Obtain a direction of arrival parameter of a user equipment within the service range of the local cell by estimation according to an uplink channel quality measurement reference signal reported by the user equipment within the service range of the local cell.

Specifically, the base station of the local cell estimates, by using a common DOA algorithm, an uplink SRS (Sounding reference signal, uplink channel quality measurement reference signal) reported by the user equipment within the service range of the local cell (for example, reported by the user equipment proactively and periodically or upon receiving signaling configured by the base station), and thereby obtains the DOA parameter of the user equipment within the range of the local cell, where the DOA algorithm includes a Capon algorithm, or a Music (Multiple Signal Classification, multiple signal classification) algorithm, and the embodiment of the present invention sets no limit thereto.

The principle of a DOA algorithm is described briefly herein. A signal receiving array of the antenna on the base station of the local cell estimates an array response for a received uplink SRS reported by a user equipment within the service range of the local cell, and then performs relevance scanning between array responses corresponding to different DOAs and the estimated array response, and thereby obtains a DOA parameter with a greater relevance with the SRS than a preset threshold. For example, when the DOA parameter is downtilt information of a time-frequency resource block on the antenna of the local cell with respect to user equipments within the service range of the local cell, the signal receiving array performs relevance scanning on the received SRS between 0° and 180° in a vertical direction, and uses the Capon algorithm to obtain that the signal received strengths of the SRS between 10° and 15° are all greater than a preset threshold; and therefore, it is considered that the downtilt of the time-frequency resource block on the antenna of the local cell with respect to the user equipment within the service range of the local cell is between 10° and 15°. When the DOA parameter is azimuth angle information of a time-frequency resource block of the antenna of the local cell with respect to user equipments within the service range of the local cell, the signal receiving array performs relevance scanning on the received SRS between 0° and 360° in a horizontal direction, and uses the Capon algorithm to obtain that the signal received strengths of the SRS between 85° and 95° are all greater than a preset value; and therefore, it is considered that the azimuth angle of the time-frequency resource block on the antenna of the cell with respect to the user equipment within the service range of the local cell is between 85° and 95°.

Mode 2: Transmit channel state information reference signals of different direction of arrival parameters to a user equipment within the service range of the local cell on pilot resource elements within a time-frequency resource block on the antenna of the local cell, and receive a direction of arrival parameter which is returned by the user equipment within the service range of the local cell and corresponding to a reference signal whose signal received strength measured on the reference signal is greater than a preset threshold.

Figure 7:
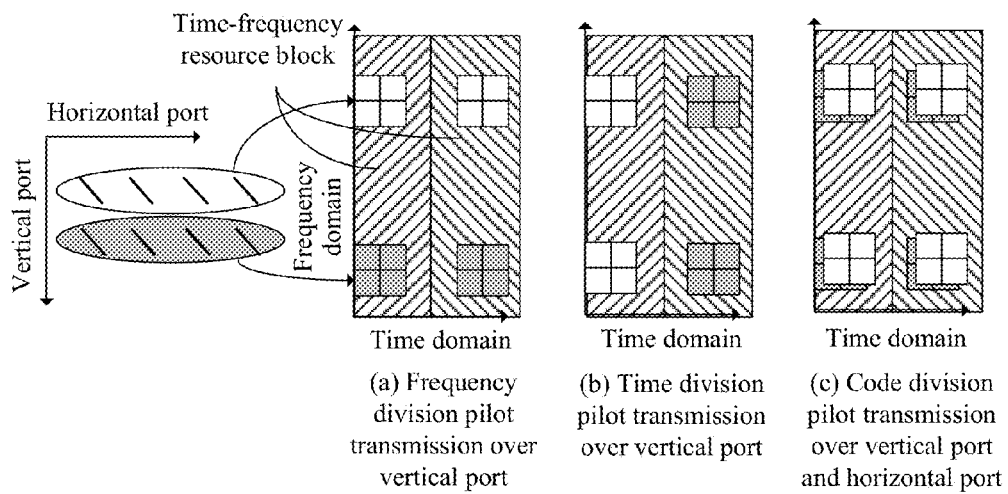
FIG. 7 is a schematic diagram of transmitting different downlink CSI-RSs to a user equipment according to an embodiment of the present invention.

Specifically, referring to FIG. 7, the base station of the local cell transmits different CSI-RSs (Channel state information reference signal, channel state information reference signal) to a user equipment within the service range of the local cell, where each CSI-RS uses a different DOA parameter. The user equipment receives the CSI-RSs, measures signal received strengths of the CSI-RSs, and returns, to the base station of the local cell, a DOA parameter corresponding to a measured CSI-RS with a signal received strength greater than a preset value. The base station of the local cell receives the DOA parameter returned by the user equipment.

For example, when the DOA parameter is downtilt information of a time-frequency resource block of the antenna of the local cell with respect to user equipments within the service range of the local cell and azimuth angle information of a time-frequency resource block on the antenna of the local cell with respect to user equipments within the service range of the local cell, the base station of the local cell transmits CSI-RSs with respective DOA parameters as 1°/6°, 3°/8°, 5°/8°, and 6°/10° to a user equipment within the service range of the local cell. The user equipment receives the CSI-RSs, and measures signal received strengths of the CSI-RSs with the foregoing DOA parameters, which are, for example, 48%, 89%, 60%, and 40%, respectively. The user equipment may return, to the base station of the local cell, the DOA parameters 3°/8°, and 5°/8° corresponding to CSI-RSs whose signal received strengths are greater than 50%.

In an actual operation, after measuring and obtaining the DOA information, a user equipment may number a DOA with an index number, and return the index number of the DOA to the base station of the local cell. When the user equipment needs to return multiple DOAs to the base station of the local cell, the user equipment may report index numbers of the multiple DOAs to the base station of the local cell by using a differential mode in the prior art. After receiving the index numbers of the DOAs returned by the user equipment, the base station of the local cell queries and obtains DOA information according to a pre-stored mapping table between index numbers and DOA information.

Mode 3: Transmit reference signals to a user equipment within the service range of the local cell on pilot resource elements within a time-frequency resource block on the antenna of the local cell in a time division, frequency division, or code division mode; receive a pre-code matrix of a channel state that is obtained by the user equipment within the service range of the local cell by estimation according to the reference signals; and obtain a direction of arrival parameter of the user equipment within the service range of the local cell by estimation according to the pre-code matrix.

Specifically, referring to FIG. 7, the base station sends reference signals to a user equipment within the service range of the antenna of the local cell by using pilot resource elements within a time-frequency resource block of the antenna of the local cell in a time division, a frequency division, or a code division mode. The user equipment receives the reference signals; obtains channel states of channels corresponding to the pilot resource elements by estimation according to the reference signals, to obtain an $N_r \times M$ dimensional channel matrix; and then, according to the channel matrix, obtains a pre-code matrix which is recommended for a transmit end to use, where $N_r$ is the number of receive antennas on the user equipment, and M is the number of pilot resource elements within the time-frequency resource block on the antenna of the base station. The base station receives the pre-code matrix returned by the user equipment, and decodes the pre-code matrix to obtain a DOA parameter of the user equipment.

Each square in FIG. 7 represents one pilot resource element within a time-frequency resource block on the antenna of the local cell.

An example with eight antenna array ports is briefly described herein. Frequency division transmission mode: reference signals are sent to a user equipment within the service range of the antenna of the local cell by using pilot resource elements within a time-frequency resource block on the antenna of the local cell at different frequency points at one time point. Specifically, in the mode illustrated by (a) in FIG. 7, a time-frequency resource block has eight pilot resource elements, where each four pilot resource elements occupy one frequency point (a shaded portion and a non-shaded portion each represent one frequency point). At one time point, reference signals of eight ports are sent to a user equipment within the service range of the antenna of the local cell at the two frequency points by using the eight pilot resource elements, as shown in a first column and a second column in (a), which presents a schematic diagram of transmitting reference signals at two time points in a frequency division transmission mode.

Time division transmission mode: at different time points of one frequency point, reference signals are sent to a user equipment within the service range of the antenna of the local cell by using the pilot resource elements within a time-frequency resource block on the antenna of the local cell. Specifically, in the mode illustrated by (b) in FIG. 7, a time-frequency resource block has eight pilot resource elements that are divided to two groups of four at two frequency points. Pilot signals of eight array ports are sent by using the eight pilot resource elements at two different time points of one frequency point, as shown in a first row and a second row in (b), which presents a schematic diagram of transmitting reference signals at two different time points of one frequency point.

Code division transmission mode: at one frequency point and one time point, reference signals are sent to user equipments within the service range of the antenna of the local cell by using the pilot resource elements within a time-frequency resource block on the antenna of the local cell. For example, as illustrated by (c) in FIG. 7, the time-frequency resource block has eight pilot resource elements, where eight array ports are divided into two groups with each group having four ports. A pilot signal of an $n^{th}$ port (where n=1, 2, 3, 4) in group 1 is multiplied by a sequence (recorded as a) with a length of 2, and is placed in two resource elements of the eight pilot resource elements (where the two resource elements are expressed as an $n^{th}$ group of the eight resource elements); a pilot signal at an $n^{th}$ port in group 2 is multiplied by another sequence with a length of 2 (expressed as b, where a is orthogonal to b), and is placed in the $n^{th}$ pilot resource element at the same place as the pilot signal at the $n^{th}$ port in group 1 is placed, where a specific mode is illustrated by (c) in FIG. 7.

In an actual operation, after obtaining a pre-code matrix, a user equipment may number the pre-code matrix with an index number, and return the index number of the pre-code matrix to the base station. The base station searches a pre-stored mapping table between index numbers and pre-code matrixes according to the received index number of the pre-code matrix, and thereby obtains the pre-code matrix. If the DOA parameter includes downtilt information and azimuth angle information of a time-frequency resource block of the antenna of the local cell with respect to user equipments within the service range of the local cell, and the downtilt information and azimuth angle information are separable, the downtilt information and azimuth angle information are quantized separately and represented by index numbers; then, the index numbers are reported to the base station in a separate or combined manner; and if the downtilt information and azimuth angle information are inseparable, the pre-code matrix is quantized uniformly and then a corresponding index number is reported to the base station.

In addition, it should be noted that, when the method described in mode 2 or mode 3 is used to obtain a DOA parameter of a user equipment, the base station needs to configure a signaling process in advance, to instruct the user equipment to get prepared to measure CSI-RSs or pilots and return measurement information within a required period.

For example, the downtilt information, obtained by using one of the foregoing modes, of a time-frequency resource block on the antenna of the local cell with respect to user equipments within the service range of the local cell and signal received strengths at the downtilts are shown in Table 1.

TABLE 1

| | Cell | |
|---|---|---|
| UE | Downtilt information of a time-frequency resource block of an antenna of a cell with respect to a UE | Signal received strength |
| $UE_1$ | 1° | 89% |
| | 3° | 70% |
| | 5° | 55% |
| | 8° | 43% |
| | 12° | 32% |
| | 15° | 12% |
| $UE_2$ | 2° | 25% |
| | 5° | 40% |
| | 7° | 60% |
| | 10° | 73% |
| | 13° | 80% |
| | 14° | 90% |
| $UE_3$ | 4° | 13% |
| | 5° | 35% |
| | 7° | 53% |
| | 9° | 88% |
| | 11° | 80% |
| | 15° | 65% |
| ... | ... | ... |

In the embodiment of the present invention, after a DOA parameter of a user equipment is obtained, the downtilt or/and azimuth angle of the antenna with respect to user equipments within the service range may be processed according to the obtained DOA parameter, so that the user equipment can better receive signals. The embodiment of the present invention focuses on how to set, according to the downtilt information in the obtained DOA parameter, the downtilt of a time-frequency resource block on an antenna with respect to a to-be-coordinated user equipment; how to process the azimuth angle of an antenna with respect to a user equipment within the service range according to the azimuth angle information in the obtained DOA parameter is similar, and details are not repeated herein.

Step 201-1-2: The base station of the local cell determines optimal downtilt information of the time-frequency resource blocks on the antenna of the local cell with respect to user equipments within the service range of the local cell according to the direction of arrival parameters.

Specifically, defining an optimal downtilt of a time-frequency resource block on the antenna of the cell with respect to a user equipment within the service range according to the downtilt information of the time-frequency resource block on the antenna of the local cell with respect to the user equipment within the service range of the local cell in an obtained direction of arrival parameter and the signal received strengths corresponding to the downtilt information includes:

selecting, from the downtilt information of the time-frequency resource block on the antenna of the local cell with respect to user equipments within the service range of the local cell in the obtained direction of arrival parameter, a downtilt with respect to the user equipment that allows the user equipment to receive a signal sent by the base station with a greatest signal received strength, as an optimal downtilt of the time-frequency resource block on the antenna with respect to user equipments within the service range.

According to the contents of Table 1, the optimal downtilts of a time-frequency resource block on the antenna of the local cell with respect to user equipments within the service range are shown in Table 2.

TABLE 2

| Cell | |
|---|---|
| User equipment | Optimal downtilt |
| $UE_1$ | 1° |
| $UE_2$ | 14° |
| $UE_3$ | 9° |
| ... | ... |

The base station of the local cell may obtain location information of a user equipment within the service range of the local cell by using one of the following two modes.

Mode 1: Obtain a direction of arrival parameter of the user equipment within the service range of the local cell by estimation according to an uplink channel quality measurement reference signal reported by the user equipment within the service range of the local cell, where the direction of arrival parameter at least includes downtilt information of the time-frequency resource block on the antenna of the local cell with respect to user equipments within the service range of the cell; and obtain the location information of the user equipment within the service range of the local cell by calculation according to the direction of arrival parameter.

Figure 1:
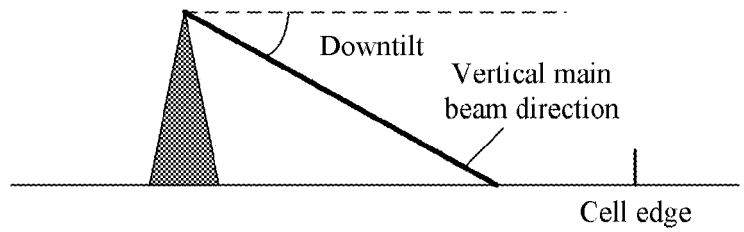
FIG. 1 is a schematic diagram of a downtilt of an antenna in a prior art of the present invention.
Figure 2:
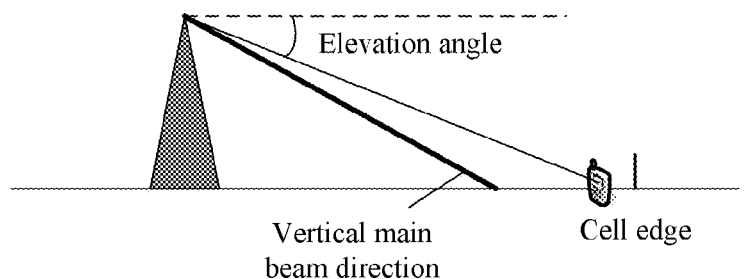
FIG. 2 is a schematic diagram of an elevation angle of a UE in a prior art of the present invention.

Specifically, referring to FIG. 2, the location of the user equipment may be obtained by calculation according to the downtilt information of the time-frequency resource block on the antenna of the local cell with respect to the user equipment, based on a geometrical trigonometric function formula.

Mode 2: Receive location information which is obtained by the user equipment within the service range of the local cell by performing positioning according to a predetermined positioning technology.

Specifically, after receiving, from the base station of the local cell, an instruction for obtaining location information of the user equipment, the user equipment returns, to the base station of the local cell, the location information obtained by positioning itself using a predetermined positioning technology, where the predetermined positioning technology includes positioning technologies such as GPS positioning, DOA positioning, or TDOA positioning.

Obtaining, by the base station of the local cell, use probabilities of downtilts on each time-frequency resource block on the antenna of the cell includes: performing statistics, by the base station of the local cell, on historical use of downtilts on each time-frequency resource block on the antenna of the local cell to obtain the use probabilities of downtilts on each time-frequency resource block on the antenna of the local cell.

Obtaining, by the base station of the local cell, downtilts not recommended by the local cell for time-frequency resource blocks on an antenna of a neighboring cell specifically is: receiving downtilt information, reported by at least one user equipment served by the local cell, of a time-frequency resource block on the antenna of the neighbor cell with respect to the predetermined user equipment, and selecting the downtilts not recommended by the local cell for time-frequency resource blocks on the antenna of the neighboring cell from the downtilt information of the time-frequency resource block on the antenna of the neighbor cell with respect to the predetermined user equipment.

For example, regarding UE 1 served by the local cell within an overlap coverage area of the local cell and the neighbor cell, when a downtilt of a time-frequency resource block on the antenna of the neighbor cell with respect to UE 1 is 2°, a received strength of a signal received by UE 1 from the neighbor cell is 35%, which indicates that UE 1 receives strong interference from the neighbor cell. As a result, the downtilts not recommended by the local cell for a neighboring cell are downtilts smaller than 2°.

Step 201-2: The base station of the local cell obtains the downtilt coordination information of the neighbor cell, where the downtilt coordination information of the neighbor cell includes one or more of: optimal downtilt information of time-frequency resource blocks on an antenna of a neighbor cell with respect to user equipments within a service range of a neighbor cell, location information of user equipments within the service range of a neighbor cell, location information of a base station of a neighbor cell, use probabilities of downtilts on each time-frequency resource block on the antenna of a neighbor cell, probabilities that each time-frequency resource block of the base station of a neighbor cell is assigned to different user equipments, and downtilts not recommended for time-frequency resource blocks on an antenna of a neighboring cell.

Specifically, the base station of the local cell receives the downtilt coordination information of the neighbor cell sent by the base station of the neighbor cell, where the downtilt coordination information of the neighbor cell is obtained by the base station of the neighbor cell by using the method described in step 201-1, and details are not repeated herein.

In specific implementation, over a predetermined interface, the base station of the local cell receives the downtilt coordination information of the neighbor cell sent by the base station of the neighbor cell, and optionally, may also send the obtained downtilt coordination information of the local cell to the base station of the neighbor cell, where the predetermined interface may be an X2 interface between two neighboring base stations.

In addition, it should be noted that, when the downtilt coordination information of the neighbor cell obtained by the base station of the local cell includes downtilts not recommended by the neighbor cell for time-frequency resource blocks on an antenna of a neighboring cell, the following method may be used for implementation:

obtaining a direction of arrival parameter of a user equipment within the service range of the neighbor cell, where the direction of arrival parameter at least includes downtilt information of a time-frequency resource block on the antenna of the local cell with respect to the user equipment within the service range of the neighbor cell, and determining, according to the direction of arrival parameter, downtilts not recommended by the neighbor cell for time-frequency resource blocks on an antenna of a neighboring cell.

Obtaining the direction of arrival parameter of a user equipment within the service range of the neighbor cell includes:

sending channel state information reference signals of different direction of arrival parameters to the user equipment within the service range of the neighbor cell on pilot resource elements within a time-frequency resource block on the antenna of the local cell, and receiving a direction of arrival parameter returned by the user equipment within the service range of the neighbor cell and corresponding to a reference signal whose signal received strength obtained by measurement on the reference signal is greater than a preset threshold; where, in actual implementation, the user equipment within the service range of the neighbor cell may obtain information related to the reference signals of the local cell from the base station of the local cell in advance, where the direction of arrival parameter returned by the user equipment after measurement may be sent directly to the base station of the local cell, or may be sent to the base station of the neighbor cell which serves the user equipment, and then forwarded by the base station of the neighbor cell to the base station of the local cell over an interface with the base station of the local cell; or sending reference signals to a user equipment within the service range of the neighbor cell on pilot resource elements within a time-frequency resource block on the antenna of the local cell in a time division, frequency division, or code division mode, receiving a pre-code matrix of a channel state obtained by the user equipment within the service range of the neighbor cell by estimation according to the reference signals, and obtaining, by estimation according to the pre-code matrix, the direction of arrival parameter of the user equipment within the service range of the neighbor cell; where, in actual implementation, the user equipment within the service range of the neighbor cell may obtain information related to the reference signals of the local cell from the base station of the local cell in advance, and the pre-code matrix of the channel state returned by the user equipment after measurement may be sent directly to the base station of the local cell, or may be sent to the base station of the neighbor cell which serves the user equipment, and then forwarded by the base station of the neighbor cell to the base station of the local cell over an interface with the base station of the local cell; or obtaining the direction of arrival parameter of the user equipment within the service range of the antenna of the neighbor cell by estimation according to an uplink channel quality measurement reference signal reported by the user equipment within the service range of the antenna of the neighbor cell; where, in actual implementation, before measuring the reference signal, the base station of the local cell may obtain, according to information notified by the base station of the neighbor cell explicitly or implicitly, a sequence used by the uplink channel quality measurement reference signal reported by the user equipment within the service range of the antenna of the neighbor cell.

For detailed description of the foregoing method, reference may be made to the related description in step 201-1-1, and details are not repeated herein.

Optionally, step 202: the base station of the local cell assigns, according to the downtilt coordination information of the local cell, a time-frequency resource block on the antenna of the local cell to the to-be-coordinated user equipment.

Specifically, the time-frequency resource block is assigned on the antenna of the local cell to the to-be-coordinated user equipment by using the following three modes.

Mode 1: Classify user equipments within the service range of the local cell, and assign a time-frequency resource block on the antenna of the local cell to the to-be-coordinated user equipment according to the classification information of user equipments within the service range of the local cell based on an FFR (Fractional Frequency Reuse, fractional frequency reuse) scheduling principle.

This mode specifically includes the following steps.

Step 202-1A: Classify, by location, user equipments within the service range of the local cell to obtain location classification information of user equipments within the service range of the cell.

User equipments within the service range of the local cell may be classified by location by using one of the following modes.

Mode A: Classify user equipments within the service range of the local cell based on a pre-defined assignment rule according to the optimal downtilt information, in the downtilt coordination information of the local cell, of time-frequency resource blocks on the antenna of the local cell with respect to user equipments within the service range of the local cell.

Specifically, a user equipment whose user equipment optimal downtilt falls within a first predefined range is regarded as a user equipment of a first category; a user equipment whose user equipment optimal downtilt falls within a second predefined range is regarded as a user equipment of a second category, and a user equipment whose user equipment optimal downtilt falls within a third predefined range is regarded as a user equipment of a third category, and so on. For example, a user equipment whose user equipment optimal downtilt falls within a range of 1° to 5° is regarded as a user equipment of a first category, which is referred to as a cell-edge user equipment; a user equipment whose user equipment optimal downtilt falls within a range of 6° to 10° is regarded as a user equipment of a second category, which is referred to as a cell-outer user equipment; and a user equipment whose user equipment optimal downtilt falls within a range of 11° to 15° is regarded as a user equipment of a third category, which is referred to as a cell-center user equipment.

User equipments after the classification may be represented by using a set $UE_x=\{ue_i|foe(ue_i)\in\Theta_x\}$, where x represents a range subscript ("center", "outer", or "edge") of a downtilt of a time-frequency resource block on an antenna with respect to the user equipment, and "center", "outer", and "edge" respectively represent the center area, outer area, and edge area of the cell; $foe(ue_i)$ is an optimal downtilt of $ue_i$; $\Theta_x$ is an angle range corresponding to the x area. For example, in the above example, $\Theta_{edge}=\{\theta|1°\leq\theta\leq5°\}$, $\Theta_{outer}=\{\theta|6°\leq\theta\leq10°\}$, and $\Theta_{center}=\{\theta|11°\leq\theta\leq15°\}$.

For example, according to Table 2, $UE_1$ belongs to $UE_{edge}$, $UE_3$ belongs to $UE_{outer}$, and $UE_2$ belongs to $UE_{center}$.

Mode B: Classify user equipments within the service range of the local cell according to the location information, in the downtilt coordination information of the local cell, of user equipments within the service range of the local cell.

Step 202-2A: Select, according to the location classification information of user equipments within the service range of the local cell, a category of user equipments of great coordination urgency within the service range of the local cell, which are expressed as a set $UE_{edge,l}$.

As shown in FIG. 2, generally, when a vertical beam points to UEs in the cell edge area, the interference on a neighbor cell is greater than when the vertical beam points to UEs in the cell outer area or cell center area. That is, UEs belonging to $UE_{edge}$ are of great coordination urgency. It is assumed that there are two neighboring cells. UEs belonging to $UE_{edge}$ and selected from downtilt coordination information of cell 1 include $UE_1$, $UE_5$, and $UE_7$, which are expressed as $UE_{edge,1}$; and UEs belonging to $UE_{edge}$ and selected from downtilt coordination information of cell 2 include $UE_{10}$, $UE_9$, and $UE_{60}$, which are expressed as $UE_{edge,2}$.

Step 202-3A: Several neighboring cells identify non-overlapping frequency bands $F_1, \ldots, F_L$. For example, cell 1 corresponds to $F_1$, cell 2 corresponds to $F_2, \ldots,$ and cell L corresponds to $F_L$, where $F_l$ refers to a coordination frequency band of cell l.

Step 202-4A: Allocate $UE_{edge,l}$ of the neighboring cells to different coordination frequency bands.

For example, cell 1 allocates $UE_{edge,1}=\{UE_1, UE_5, UE_7\}$ to the frequency band $F_1$, and cell 2 allocates $UE_{edge,2}=\{UE_{10}, UE_9, UE_{60}\}$ to the frequency band $F_2$.

Step 202-5A: Coordinate and schedule time-frequency resources for user equipments on the assigned frequency bands according to PF (Proportional Fair, proportional fair) priorities. Specifically, a time-frequency resource is assigned to a user equipment with a highest PF priority on the time-frequency resource.

For example, cell 1 schedules user equipments within $UE_{edge,1}$ on $F_1$ according to PF priorities, where $UE_1$ has the highest PF priority on the time-frequency resource $RU_1$, and assigns $RU_1$ to $UE_1$; and schedules UEs served by cell 1 other than UEs in $UE_{edge,1}$ on $F_2$. Cell 2 schedules UEs within $UE_{edge,2}$ on $F_2$ according to PF priorities, and schedules user equipments served by cell 2 other than user equipments in $UE_{edge,2}$ on $F_1$.

In this step, UEs that may substantially interfere with each other in the two neighboring cells are allocated onto two different frequency bands, which prevents the neighbor cell from assigning the same time-frequency resource to user equipments that substantially interfere with the neighbor cell, thereby reducing difficulty in subsequent downtilt coordination.

Mode 2: Classify user equipments within the service range of the local cell, and assign a time-frequency resource block on the antenna of the local cell to the to-be-coordinated user equipment according to the classification information of user equipments within the service range of the local cell based on an SFR (Soft Frequency Reuse, soft frequency reuse) scheduling principle.

This mode specifically includes the following steps.

Step 202-1B: Classify, by location, user equipments within the service range of the local cell to obtain location classification information of user equipments within the service range of the cell.

For a specific implementation process of this step, reference may be made to description of step 202-1A, and details are not repeated herein.

Step 202-2B: Select, according to the location classification information of user equipments within the service range of the local cell, a category of user equipments of great coordination urgency within the service range of the local cell, which are expressed as a set $UE_{edge,l}$.

This step is specifically the same as step 202-2A, and details are not repeated herein.

Step 202-3B: Several neighboring cells identify non-overlapping frequency bands $F_1, \ldots, F_L$. For example, cell 1 corresponds to $F_1$, cell 2 corresponds to $F_2, \ldots,$ and cell L corresponds to $F_L$, where $F_l$ refers to a coordination frequency band of cell l.

Step 202-4B: User equipments in $UE_{edge,l}$ of cell l have high priorities on a identified coordination frequency band, and other user equipments served by cell l have low priorities on the coordination frequency band; and user equipments in $UE_{edge,l}$ of cell l have low priorities on a non-coordination frequency band, and other user equipments served by cell l have high priorities on the non-coordination frequency band.

Step 202-5B: Coordinate and assign time-frequency resources for user equipments on the assigned frequency bands according to PF (Proportional fair, proportional fair) priorities, and adjust the priorities of the user equipments.

Specifically, when assigning resource blocks on $F_l$, cell l determines whether a user equipment belongs to $UE_{edge,l}$, and if yes, the PF priority of the user equipment is adjusted to:

$PF=(1+a)PF_{origion}$ and otherwise, to $PF=(1-b)PF_{origion}$ where $PF_{origion}$ is a PF obtained by calculation according to a CQI (Channel quality indicator, channel quality indicator) and historical rates before the adjustment, a>1 and 0<b<1. Similarly, when assigning resource blocks on frequency bands other than $F_l$, cell l determines whether a user equipment belongs to $UE_{edge,l}$; if not, the PF priority of the user equipment is adjusted to $PF=(1+c)PF_{origion}$ and otherwise, to $PF=(1-d)PF_{origion}$ where c>1 and 0<d<1.

Step 202-6B: Assign time-frequency resources to user equipments according to the adjusted priorities, and specifically, a time-frequency resource is assigned to a user equipment with a highest PF priority on the time-frequency resource.

Mode 3: Classify user equipments within the service range of the local cell, and assign a time-frequency resource block on the antenna of the local cell to the to-be-coordinated user equipment based on a self-defined dynamic scheduling principle according to the classification information of user equipments within the service range of the local cell and the use probabilities, in the coordination information of the neighbor cell, of downtilts on each time-frequency resource block on the antenna of the neighbor cell.

For a method for classifying user equipments within the service range of the local cell, reference may be made to the description of step 202-1A and details are not repeated herein.

The coordination and scheduling according to a self-defined dynamic scheduling principle specifically includes the following:

When assigning a $k^{th}$ resource block to a user equipment, the local cell makes reference to the downtilt coordination information of the neighbor cell, and adjusts a priority of the user equipment according to the information. For example, the local cell determines a coordination rule according to the downtilts not recommended for use or use probabilities of downtilts in the downtilt coordination information of the neighbor cell. A preferred rule is that, on the same resource block:

1) it is avoided that user equipments within the service range of the antenna of the neighbor cell belong to $UE_{edge}$ sets of their respective cells;

2) if a downtilt $\theta_2$ with respect to user equipments within the service range of the antenna of the neighbor cell on the resource block belongs to a set $\Theta_{edge}$, the local cell assigns the resource block preferentially to a user equipment in $UE_{center}$, and secondly to a user equipment in $UE_{outer}$;

3) if a downtilt $\theta_2$ with respect to user equipments within the service range of the antenna of the neighbor cell on the resource block belongs to a set $\Theta_{outer}$, the local cell assigns the resource block preferentially to a user equipment in $UE_{outer}$, secondly to a user equipment in $UE_{center}$, and thirdly to a user equipment in $UE_{edge}$; and 4) if a downtilt $\theta_2$ with respect to user equipments within the service range of the antenna of the neighbor cell on the resource block belongs to a set $\Theta_{center}$, the local cell assigns the resource block preferentially to a user equipment in $UE_{outer}$, secondly to a user equipment in $UE_{edge}$, and thirdly to a user equipment in $UE_{center}$.

The above describes merely one self-defined dynamic scheduling principle provided by the embodiment of the present invention. Any modification, equivalent replacement, and improvement made to the self-defined dynamic scheduling principle within the spirit and principle of the present invention shall fall within the protection range of the present invention.

It should be noted that step 202 is an optional step. This step ensures, as much as possible through resource assignment, that vertical beams do not collide when downtilts of neighboring cells with respect to user equipments on the same resource block equal the optimal downtilts with respect to the user equipment, thereby reducing difficulty in subsequent downtilt coordination.

Step 203: Set, according to the downtilt coordination information of the local cell and the downtilt coordination information of the neighbor cell, a downtilt of a time-frequency resource block on the antenna of the local cell with respect to the to-be-coordinated user equipment.

This step specifically includes the following operations.

Step 203-1: Determine a range of usable downtilts for time-frequency resource blocks on the antenna of the local cell with respect to user equipments within the service range of the local cell according to the downtilt coordination information of the local cell and the downtilt coordination information of the neighbor cell.

Determining a range of usable downtilts for time-frequency resource blocks on the antenna of the local cell with respect to user equipments within the service range of the local cell according to the downtilt coordination information of the local cell and the downtilt coordination information of the neighbor cell may include:

determining a range of optimal downtilts for time-frequency resource blocks on the antenna of the local cell with respect to user equipments within the service range of the local cell according to the optimal downtilt information, in the downtilt coordination information of the local cell, of time-frequency resource blocks on the antenna of the local cell with respect to user equipments within the service range of the local cell; and using a range of downtilts within the range of optimal downtilts, excluding downtilts which are in the downtilt coordination information of the neighbor cell and are not recommended for a neighboring cell, as the range of usable downtilts for time-frequency resource blocks on the antenna of the local cell with respect to user equipments within the service range of the local cell.

For example, according to Table 2, the optimal downtilt of the user equipment UE1 within the service range of the local cell is 1°, the optimal downtilt of UE2 is 14°, and the optimal downtilt of UE3 is 9°. Therefore, the range of optimal downtilts of time-frequency resource blocks on the antenna of the local cell with respect to user equipments within the service range of the local cell may be set to 1° to 14°. In the downtilt coordination information of the neighbor cell received from the base station of the neighbor cell, downtilts not recommended for a neighboring cell on a time-frequency resource block are smaller than 4°. Therefore, the range of usable downtilts of the time-frequency resource block on the antenna of the local cell with respect to user equipments within the service range of the local cell is 4° to 14°.

Alternatively, determining a range of usable downtilts for time-frequency resource blocks on the antenna of the local cell with respect to user equipments within the service range of the local cell according to the downtilt coordination information of the local cell and the downtilt coordination information of the neighbor cell may include:

determining a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; obtaining a set consisting of neighbor cell downtilts whose use probabilities exceed a first threshold according to use probabilities, in the downtilt coordination information of the neighbor cell, of downtilts of the antenna of the neighbor cell on the time-frequency resource blocks; according to location information of the base station of the neighbor cell and location information of the base station of the local cell, calculating a downtilt set B of the antenna of the local cell with respect to geographical locations corresponding to the set consisting of the neighbor cell downtilts; and using a range of downtilts within the range of the optimal downtilts, excluding downtilts in the set B, as the range of usable downtilts for time-frequency resource blocks on the antenna of the local cell with respect to user equipments within the service range of the local cell; or determining a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; according to location information, in the downtilt coordination information of the neighbor cell, of UEs within the service range of the neighbor cell and location information of the base station of the local cell, calculating a downtilt set C of the antenna of the local cell with respect to the location information of the UEs of the neighbor cell; or according to optimal downtilt information of time-frequency resource blocks on the antenna of the neighbor cell with respect to user equipments within the service range of the neighbor cell and the location information of the base station of the neighbor cell, calculating geographical locations corresponding to the optimal downtilts, and according to the geographical locations corresponding to the optimal downtilts and the location information of the base station of the local cell, calculating a downtilt set C of the antenna of the local cell with respect to the geographical locations corresponding to the optimal downtilts; and using a range of downtilts within the range of optimal downtilts, excluding downtilts in the set C, as the range of usable downtilts for time-frequency resource blocks on the antenna of the local cell with respect to user equipments within the service range of the local cell; or determining a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; according to probabilities, in the downtilt coordination information of the neighbor cell, that each time-frequency resource block of the base station of the neighbor cell is assigned to different user equipments, searching for a user equipment whose probability of being assigned with a time-frequency resource block of the neighbor cell is greater than a second threshold, and according to location information of the found UE and the location information of the base station of the local cell, calculating a downtilt set D of the antenna of the local cell with respect to the location information of the found UE; or according to optimal downtilt information of time-frequency resource blocks on the antenna of the neighbor cell with respect to the found UE and the location information of the base station of the neighbor cell, calculating geographical locations corresponding to the optimal downtilts, and according to the geographical locations corresponding to the optimal downtilts and the location information of the base station of the local cell, calculating a downtilt set D of the antenna of the local cell with respect to the geographical locations corresponding to the optimal downtilts; and using a range of downtilts within the range of optimal downtilts, excluding downtilts in the set D, as the range of usable downtilts for time-frequency resource blocks on the antenna of the local cell with respect to user equipments within the service range of the local cell.

The downtilt set B, C, or D may be downtilts not recommended by the neighbor cell for time-frequency resource blocks on an antenna of a neighboring cell to use, and may be obtained by the base station of the neighbor cell and then sent to the base station of the local cell as downtilt coordination information, or may be obtained by the base station of the local cell according to the foregoing methods.

Figure 8:
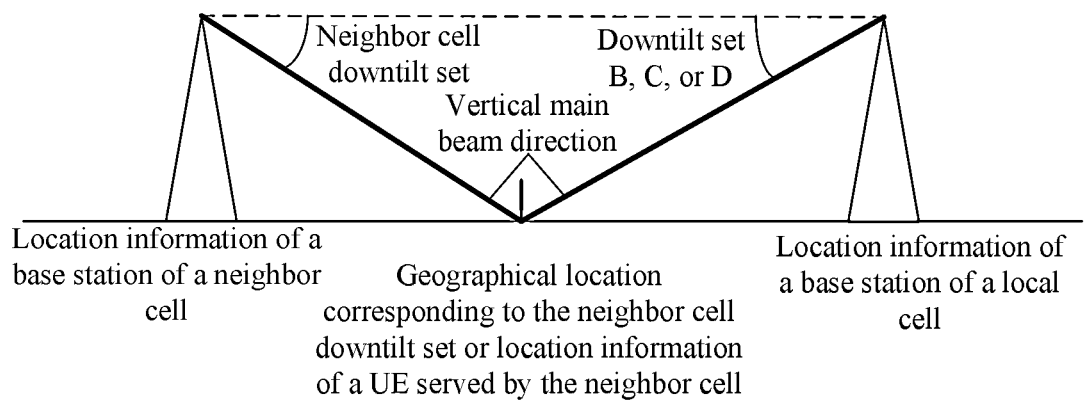
FIG. 8 is a schematic diagram of a method for calculating a downtilt set according to an embodiment of the present invention.

FIG. 8 may be referenced to for a method for calculating the downtilt set B, C, or D, where the geographical location that a vertical main beam of the neighbor cell points to, that is, the geographical location corresponding to the downtilt set of the neighbor cell, may be obtained according to a geometrical relationship by using the downtilts in the downtilt set of the neighbor cell and the location information of the base station of the neighbor cell. The downtilt set (for example, B, C, or D) of the antenna of the local cell may be obtained according to a geometrical relationship by using the location information of the base station of the local cell and the geographical location corresponding to the downtilt set of the neighbor cell. Of course, the downtilt set (for example, B, C, or D) of the antenna of the local cell may also be obtained according to the geometrical relationship directly by using the location information of UEs served by the neighbor cell and the location information of the base station of the local cell.

Alternatively, determining a range of usable downtilts for time-frequency resource blocks on the antenna of the local cell with respect to user equipments within the service range of the local cell according to the downtilt coordination information of the local cell and the downtilt coordination information of the neighbor cell may include:

obtaining a distance between the base station of the local cell and the base station of the neighbor cell by calculation according to the location information of the base station of the neighbor cell in the neighbor cell coordination information and the location information of the base station of the local cell in the local cell coordination information, and obtaining the range of usable downtilts for time-frequency resource blocks on the antenna of the local cell with respect to user equipments within the service range of the local cell by calculation according to the distance and a vertical main beam width of the antenna of the local cell based on a geometrical relationship.

An example of obtaining a range of usable downtilts based on a geometrical relationship is as follows:

$$\Theta_{valid_x} = [\theta_{OP} - BW/a, \beta]$$

where $\Theta_{valid_x}$ is the range of usable downtilts for time-frequency resource blocks on the antenna of the local cell with respect to user equipments within the service range of the local cell; $\theta_{OP} = \arctan(b \times H/D) - BW/c$, where BW is the vertical main beam width of the antenna of the local cell, H is a difference between the height of the base station and an average height of user equipments, and D is the distance between the base station of the local cell and the base station of the neighbor cell; and a, b, c, and β are positive real numbers and preferably, a is 8, b is 2, c is 2, and β is 90°.

Persons of ordinary skill in the art may obtain information such as the vertical main beam width of the antenna of the local cell, the height of the base station, and the average height of user equipments by using basic technical knowledge and common technical approaches.

Step 203-2: Set the downtilt of a time-frequency resource block on the antenna of the local cell with respect to the to-be-coordinated user equipment according to the range of usable downtilts based on a preset rule.

Specifically, in this step, the downtilt of the time-frequency resource block on the antenna of the local cell with respect to the to-be-coordinated user equipment may be set in the following four modes.

Mode 1: Obtain optimal downtilt information of the to-be-coordinated user equipment from the optimal downtilt information, in the local cell coordination information, of time-frequency resource blocks on the antenna of the local cell with respect to user equipments within the service range of the local cell; traverse all usable downtilts in the range of usable downtilts to find a usable downtilt that is closest to the optimal downtilt of the to-be-coordinated user equipment; and set the downtilt of the time-frequency resource block on the antenna of the local cell with respect to the to-be-coordinated user equipment to the usable downtilt that is closest to the optimal downtilt of the to-be-coordinated user equipment.

Mode 2: Traverse all usable downtilts in the range of usable downtilts to find a usable downtilt that allows the to-be-coordinated user equipment to have a greatest signal received power, and set the downtilt of the time-frequency resource block on the antenna of the local cell with respect to the to-be-coordinated user equipment to the usable downtilt that allows the to-be-coordinated user equipment to have the greatest signal received power.

An equation for calculating the signal received power of the to-be-coordinated user equipment is:

$$P(\theta, \theta_i) = \frac{1}{N} \sum_{n=-N/2}^{N/2} G(\theta, \theta_i + n\Delta\theta);$$

where N is a predefined number of paths, where the number of paths is a total number of channels between the antenna of the local cell and user equipments within the service range of the local cell; $n\Delta\theta$ is an estimated vertical extension angle (which may be obtained by estimation according to the obtained DOA parameter by using a common estimation algorithm in the prior art) of the antenna of the cell; and G(θ, $\theta_i + n\Delta\theta$) is an antenna gain when the downtilt set on the antenna for the to-be-coordinated user equipment is $\theta$ but the to-be-coordinated user equipment is located in $\theta_2 + n\Delta\theta$.

Persons of ordinary skill in the art may obtain the antenna gain in the foregoing equation by calculation according to basic common technical knowledge.

For example, the range of usable downtilts is 13° to 90°, while an optimal downtilt of a time-frequency resource block on the antenna with respect to the to-be-coordinated user equipment is 10°. If the downtilt on the time-frequency resource block with respect to the to-be-coordinated user equipment is set to 10°, the to-be-coordinated user equipment has the greatest signal received power. However, considering that the interference on the neighbor cell increases when the downtilt is smaller than 13°, according to the method described in mode 1, downtilts from 13° to 90° are traversed to find a usable downtilt that is closest to the optimal downtilt of the time-frequency resource block on the antenna with respect to the to-be-coordinated user equipment, that is, 13°. Therefore, the downtilt of the time-frequency resource block of the antenna of the local cell with respect to the to-be-coordinated user equipment should be set to 13°. In this case, although the user equipment does not have the greatest signal received power, the interference on the neighbor cell is reduced, which helps to improve the SINR experience of a whole system.

Mode 3: Traverse all usable downtilts in the range of usable downtilts to find a usable downtilt that allows a greatest signal-to-leakage-and-noise ratio, and set the downtilt of the time-frequency resource block on the antenna of the local cell with respect to the to-be-coordinated user equipment to the usable downtilt that allows the greatest signal-to-leakage-and-noise ratio (Signal-to-Leakage-and-Noise Ratio, SLNR).

The SLNR on the time-frequency resource block of the antenna of the local cell may be obtained by calculation according to the following formula:

$$\frac{P_T G(\theta_0, \theta_{target-UE}) PL_{UE1-cell\ 1}}{\sum_{k=1}^{k} \alpha_k P_T G(\theta_0, \theta_{UEk}) PL_{UEk-cell\ 1}}$$

The SLNR may also be obtained by calculation by using other methods in the prior art, and details are not described herein.

In the formula, $P_T$ is a transmit power when the to-be-coordinated user equipment transmits a signal (which may be obtained by performing power measurement);

$\theta_0$ is a downtilt of the time-frequency resource block of the antenna of the local cell with respect to the to-be-coordinated user equipment;

$\theta_{target-UE}$ is the optimal downtilt of the to-be-coordinated user equipment (which may be obtained from the optimal downtilt coordination information, in the downtilt coordination information of the local cell, of the time-frequency resource block of the antenna of the local cell with respect to the user equipment);

$G(\theta_0, \theta_{target-UE})$ is an antenna gain when the downtilt of the time-frequency resource on the antenna of the local cell with respect to the to-be-coordinated user equipment is set to $\theta_0$ but the to-be-coordinated user equipment is located in $\theta_{target-user\ equipment}$ (which may be obtained by calculation according to an existing method for calculating the antenna gain);

$PL_{user\ equipment\ 1-cell1}$ is a path loss from the to-be-coordinated user equipment to the local cell (which may be obtained by estimation according to the DOA parameter using an estimation algorithm in the prior art or by measurement using an RSRP (Reference Signal Received Power, reference signal received power));

$\alpha_k$ is a probability, given by the neighbor cell, that the time-frequency resource block is assigned to a $k^{th}$ user equipment (which may be obtained by performing statistics by the base station of the neighbor cell and sent to the base station of the local cell over an X2 interface); and $PL_{UEk-cell}$ is a path loss from the $k^{th}$ device within the service range of the neighbor cell to the local cell (which may be obtained by measurement using an RSRP (Reference Signal Received Power, reference signal received power)).

Mode 4: Traverse all usable downtilts in the range of usable downtilts to find a usable downtilt that allows a greatest sum of signal-to-interference-plus-noise ratios, and set the downtilt of the time-frequency resource block on the antenna of the local cell with respect to the to-be-coordinated user equipment as the usable downtilt that allows the greatest sum of signal-to-interference-plus-noise ratios.

Specifically, the sum of signal-to-interference-plus-noise ratios on the time-frequency resource block of the antenna of the local cell may be obtained by calculation according to the following formula:

$$\frac{P_T G(\theta_1, \theta_{UE1-cell\ 1}) PL_{UE1-cell\ 1}}{P_T G(\theta_2, \theta_{UE1-cell\ 2}) PL_{UE1-cell\ 2}} + \frac{P_T G(\theta_2, \theta_{UE2-cell\ 2}) PL_{UE2-cell\ 2}}{P_T G(\theta_2, \theta_{UE2-cell\ 1}) PL_{UE2-cell\ 1}}$$

The sum of signal-to-interference-plus-noise ratios may also be obtained by calculation by using other methods in the prior art, and details are not described herein.

This formula presents how to calculate a sum of signal-to-interference-plus-noise ratios of two neighboring cells. The method for calculating a sum of signal-to-interference-plus-noise ratios of several neighboring cells is similar.

In the formula, $P_T$ is a transmit power when the to-be-coordinated user equipment transmits a signal (which may be obtained by performing power measurement);

$\theta_1$ is a downtilt of a time-frequency resource block of the antenna of the local cell with respect to the to-be-coordinated user equipment within the service range of the local cell;

$\theta_2$ a downtilt of the time-frequency resource block on the antenna of the neighbor cell with respect to the to-be-coordinated user equipment within the service range of the neighbor cell, which may be obtained according to the probabilities that each time-frequency resource block on the base station of the neighbor cell is assigned to different user equipments and the optimal downtilt information of the time-frequency resource block on the antenna of the neighbor cell with respect to user equipments within the service range of the neighbor cell;

$G(\theta_1, \theta_{UE1-Cell1})$ is an antenna gain when a downtilt of the time-frequency resource on the antenna of the local cell with respect to the to-be-coordinated user equipment within the service range of the local cell is set to $\theta_1$, but the to-be-coordinated user equipment within the service range of the local cell is located in $\theta_{UE1-Cell1}$ relative to the local cell (which may be obtained by calculation according to an existing method for calculating an antenna gain);

$PL_{UE1-cell1}$ is a path loss from the to-be-coordinated user equipment within the service range of the local cell to the local cell (which may be obtained by estimation according to the DOA parameter of the local cell using an estimation algorithm in the prior art or by measurement using an RSRP (Reference Signal Received Power, reference signal received power));

$G(\theta_2, \theta_{UE2\text{-}Cell2})$ is an antenna gain when a downtilt of the time-frequency resource of the antenna of the neighbor cell with respect to the to-be-coordinated user equipment within the service range of the neighbor cell is set to $\theta_2$, but the to-be-coordinated user equipment within the service range of the neighbor cell is located in $\theta_{UE2\text{-}Cell2}$ relative to the neighbor cell (which may be obtained by calculation according to an existing method for calculating an antenna gain);

$PL_{UE2\text{-}cell2}$ is a path loss from the to-be-coordinated user equipment within the service range of the neighbor cell to the neighbor cell (which may be obtained by estimation according to the DOA parameter of the neighbor cell or by measurement using an RSRP (Reference Signal Received Power, reference signal received power));

$G(\theta_2, \theta_{UE1\text{-}Cell2})$ is an antenna gain when a downtilt of the time-frequency resource of the antenna of the neighbor cell with respect to the to-be-coordinated user equipment within the service range of the local cell is set to $\theta_2$, but the to-be-coordinated user equipment within the service range of the local cell is located in $\theta_{UE1\text{-}Cell2}$ relative to the local cell (which may be obtained by calculation according to an existing method for calculating an antenna gain);

$PL_{UE1\text{-}cell2}$ is a path loss from the to-be-coordinated user equipment within the service range of the local cell to the neighbor cell (which may be obtained by estimation according to the DOA parameter of the local cell or by measurement using an RSRP (Reference Signal Received Power, reference signal received power));

$G(\theta_1, \theta_{UE2\text{-}Cell1})$ is an antenna gain when a downtilt of the time-frequency resource block of the antenna of the local cell with respect to the to-be-coordinated user equipment within the service range of the neighbor cell is set to $\theta_1$, but the to-be-coordinated user equipment within the service range of the neighbor cell is located in $\theta_{UE2\text{-}Cell1}$ relative to the neighbor cell (which may be obtained by calculation according to an existing method for calculating an antenna gain); and $PL_{UE2\text{-}cell1}$ is a path loss from the to-be-coordinated user equipment within the service range of the neighbor cell to the local cell (which may be obtained by estimation according to the DOA parameter of the neighbor cell). It should be noted that user equipments within the service range of the local cell or user equipments within the service range of the neighbor cell refer to: all or part of user equipments within the service range of the local cell, or all or part user equipments within the service range of the neighbor cell, where the part of user equipments refer to user equipments that require coordination, moving user equipments, or user equipments defined according to other rules within the service range of the local cell or within the service range of the neighbor cell.

By implementing the technical solutions of obtaining downtilt coordination information of a local cell and downtilt coordination information of a neighbor cell, and then setting, according to the downtilt coordination information of the local cell and the downtilt coordination information of the neighbor cell, a downtilt of a time-frequency resource block on an antenna of the local cell with respect to a to-be-coordinated user equipment, the downtilt coordination information of the local cell and that of the neighbor cell are referenced to for setting the downtilt of the time-frequency resource block on the antenna of the local cell with respect to the to-be-coordinated user equipment, which avoids interference on user equipments within a service range of the neighbor cell while ensuring signal received powers and SINR experience for user equipments within a service range of the local cell.

Figure 9:
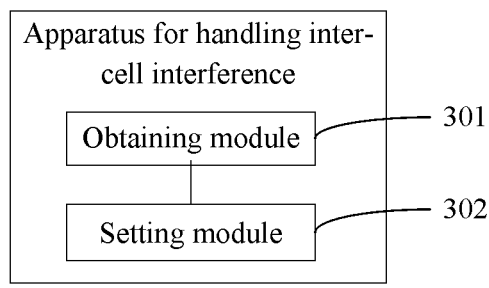
FIG. 9 is a block diagram of an apparatus for handling inter-cell interference according to an embodiment of the present invention.

Referring to FIG. 9, an embodiment of the present invention provides an apparatus for downtilt coordination. The apparatus specifically corresponds to a base station or network node in the method embodiments, and no specific limit is made thereto by the embodiment of the present invention. The apparatus includes an obtaining module 301 and a setting module 302.

The obtaining module 301 is configured to obtain downtilt coordination information of a local cell and downtilt coordination information of a neighbor cell, where either downtilt coordination information of the downtilt coordination information of the local cell and the downtilt coordination information of the neighbor cell includes one or more of: optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block of the base station of the cell is assigned to different user equipments, and downtilts not recommended for time-frequency resource blocks on an antenna of a neighboring cell.

The setting module 302 is configured to set, according to the downtilt coordination information of the local cell and the downtilt coordination information of the neighbor cell obtained by the obtaining module 301, a downtilt of a time-frequency resource block on the antenna of the local cell with respect to a to-be-coordinated user equipment.

Specific functions of the foregoing modules are described in detail as follows.

Specifically, the obtaining module 301 includes:

a first obtaining unit, configured to obtain a direction of arrival parameter of a user equipment within the service range of the local cell, wherein the direction of arrival parameter at least includes downtilt information of a time-frequency resource block on the antenna of the local cell with respect to user equipments within the service range of the local cell; and a determining unit, configured to determine, according to the direction of arrival parameter obtained by the first obtaining unit, optimal downtilt information of the time-frequency resource block on the antenna of the local cell with respect to user equipments within the service range of the local cell.

The first obtaining unit is specifically configured to transmit channel state information reference signals of different direction of arrival parameters to the user equipment within the service range of the local cell on pilot resource elements within the time-frequency resource block on the antenna of the local cell, and receive a direction of arrival parameter that is returned by the user equipment within the service range of the local cell and corresponding to a reference signal whose signal received strength measured on the reference signal is greater than a preset threshold; or the first obtaining unit is specifically configured to transmit reference signals to the user equipment within the service range of the local cell on pilot resource elements within the time-frequency resource block on the antenna of the local cell in a time division, frequency division, or code division mode; receive a pre-code matrix of a channel state that is obtained by the user equipment within the service range of the local cell by estimation according to the reference signals; and obtain, by estimation, the direction of arrival parameter of the user equipment within the service range of the local cell according to the pre-code matrix; or the first obtaining unit is specifically configured to obtain, by estimation, the direction of arrival parameter of the user equipment within the service range of the local cell according to an uplink channel quality measurement reference signal reported by the user equipment within the service range of the local cell.

Specifically, the obtaining module 301 further includes:

a second obtaining unit, configured to obtain a direction of arrival parameter of a user equipment within the service range of the local cell by estimation according to an uplink channel quality measurement reference signal reported by the user equipment within the service range of the local cell, wherein the direction of arrival parameter at least includes downtilt information of the time-frequency resource block on the antenna of the local cell with respect to user equipments within the service range of the cell; and obtain location information of the user equipment within the service range of the local cell by calculation according to the direction of arrival parameter; or a third obtaining unit, configured to receive location information that is obtained by a user equipment within the service range of the local cell by performing positioning according to a predetermined positioning technology.

A fourth obtaining unit is configured to receive downtilt information, reported by at least one user equipment served by the local cell, of a time-frequency resource block on an antenna of the neighbor cell with respect to a predetermined user equipment, and select downtilts, which are not recommended by the local cell for time-frequency resource blocks on an antenna of a neighboring cell, from the downtilt information of time-frequency resource blocks on the antenna of the neighbor cell with respect to the predetermined user equipment.

A receiving unit is configured to receive the downtilt coordination information of the neighbor cell sent by the neighbor cell.

A fifth obtaining unit is configured to obtain a direction of arrival parameter of a user equipment within the service range of the neighbor cell, where the direction of arrival parameter at least includes downtilt information of a time-frequency resource block on an antenna of the neighbor cell with respect to user equipments within the service range of the neighbor cell, and determine optimal downtilt information of the time-frequency resource block on the antenna of the neighbor cell with respect to user equipments within the service range of the neighbor cell according to the direction of arrival parameter.

The fifth obtaining unit is specifically configured to transmit channel state information reference signals of different direction of arrival parameters to the user equipment within the service range of the neighbor cell on pilot resource elements within the time-frequency resource block on the antenna of the local cell, and receive a direction of arrival parameter that is returned by the user equipment within the service range of the neighbor cell and corresponding to a reference signal whose signal received strength measured on the reference signal is greater than a preset threshold; or the fifth obtaining unit is specifically configured to transmit reference signals to the user equipment within the service range of the neighbor cell on pilot resource elements within the time-frequency resource block on the antenna of the local cell in a time division, frequency division, or code division mode; receive a pre-code matrix of a channel state that is obtained by the user equipment within the service range of the neighbor cell by estimation according to the reference signals; and obtain, by estimation, the direction of arrival parameter of the user equipment within the service range of the neighbor cell according to the pre-code matrix; or the fifth obtaining unit is specifically configured to obtain, by estimation, the direction of arrival parameter of the user equipment within the service range of the antenna of the neighbor cell according to an uplink channel quality measurement reference signal reported by the user equipment within the service range of the antenna of the neighbor cell.

Specifically, the setting module 302 includes:

a first determining unit, configured to determine a range of usable downtilts for time-frequency resource blocks on the antenna of the local cell with respect to user equipments within the service range of the local cell according to the downtilt coordination information of the local cell and the downtilt coordination information of the neighbor cell; and a setting unit, configured to set, based on a preset rule, the downtilt of a time-frequency resource block on the antenna of the local cell with respect to the to-be-coordinated user equipment according to the range of usable downtilts determined by the first determining unit.

The first determining unit is specifically configured to determine a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; and use a range of downtilts within the range of optimal downtilts, excluding downtilts which are in the downtilt coordination information of the neighbor cell and are not recommended for a neighboring cell, as the range of usable downtilts for time-frequency resource blocks on the antenna of the local cell with respect to user equipments within the service range of the local cell; or the first determining unit is specifically configured to obtain a distance between a base station of a local cell and a base station of a neighbor cell by calculation according to location information of the base station of the neighbor cell in the neighbor cell coordination information and location information of the base station of the local cell in the local cell coordination information, and obtain the range of usable downtilts for time-frequency resource blocks on the antenna of the local cell with respect to user equipments within the service range of the local cell by calculation according to the distance and a vertical main beam width of the antenna of the local cell based on a geometrical relationship; or the first determining unit is specifically configured to determine a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; obtain a set consisting of neighbor cell downtilts whose use probabilities exceed a first threshold according to use probabilities, in the downtilt coordination information of the neighbor cell, of downtilts of the antenna of the neighbor cell on time-frequency resource blocks; according to location information of the base station of the neighbor cell and location information of the base station of the local cell, calculate a downtilt set B of the antenna of the local cell with respect to geographical locations corresponding to the set consisting of the neighbor cell downtilts; and use a range of downtilts within the range of the optimal downtilts, excluding downtilts in the set B, as the range of usable downtilts for time-frequency resource blocks on the antenna of the local cell with respect to user equipments within the service range of the local cell; or the first determining unit is specifically configured to determine a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; according to location information, in the downtilt coordination information of the neighbor cell, of UEs within the service range of the neighbor cell and location information of the base station of the local cell, calculate a downtilt set C of the antenna of the local cell with respect to the location information of the UEs of the neighbor cell; or according to optimal downtilt information of time-frequency resource blocks on the antenna of the neighbor cell with respect to user equipments within the service range of the neighbor cell and the location information of the base station of the neighbor cell, calculate geographical locations corresponding to the optimal downtilts, and according to the geographical locations corresponding to the optimal downtilts and the location information of the base station of the local cell, calculate a downtilt set C of the antenna of the local cell with respect to the geographical locations corresponding to the optimal downtilts; and use a range of downtilts within the range of optimal downtilts, excluding downtilts in the set C, as the range of usable downtilts for time-frequency resource blocks on the antenna of the local cell with respect to user equipments within the service range of the local cell; or the first determining unit is specifically configured to determine a range of optimal downtilts for time-frequency resource blocks on the antenna of the local cell with respect to user equipments within the service range of the local cell according to optimal downtilt information, in the downtilt coordination information of the local cell, of time-frequency resource blocks on the antenna of the local cell with respect to user equipments within the service range of the local cell; according to probabilities, in the downtilt coordination information of the neighbor cell, that each time-frequency resource block on the base station of the neighbor cell is assigned to different user equipments, search for a user equipment whose probability of being assigned with a time-frequency resource block of the neighbor cell is greater than a second threshold, and according to location information of the found UE and the location information of the base station of the local cell, calculate a downtilt set D of the antenna of the local cell with respect to the location information of the found UE; or according to optimal downtilt information of time-frequency resource blocks on the antenna of the neighbor cell with respect to the found UE and the location information of the base station of the neighbor cell, calculate geographical locations corresponding to the optimal downtilts, and according to the geographical locations corresponding to the optimal downtilts and the location information of the base station of the local cell, calculate a downtilt set D of the antenna of the local cell with respect to the geographical locations corresponding to the optimal downtilts; and use a range of downtilts within the range of optimal downtilts, excluding downtilts in the set D, as the range of usable downtilts for time-frequency resource blocks on the antenna of the local cell with respect to user equipments within the service range of the local cell.

The setting unit is specifically configured to obtain optimal downtilt information of the to-be-coordinated user equipment from the optimal downtilt information, in the local cell coordination information, of time-frequency resource blocks on the antenna of the local cell with respect to user equipments within the service range of the local cell; traverse all usable downtilts in the range of usable downtilts to find a usable downtilt that is closest to the optimal downtilt of the to-be-coordinated user equipment; and set the downtilt of the time-frequency resource block on the antenna of the local cell with respect to the to-be-coordinated user equipment to the usable downtilt that is closest to the optimal downtilt of the to-be-coordinated user equipment; or the setting unit is specifically configured to traverse all usable downtilts in the range of usable downtilts to find a usable downtilt that allows the to-be-coordinated user equipment to have a greatest signal received power, and set the downtilt of the time-frequency resource block on the antenna of the local cell with respect to the to-be-coordinated user equipment to the usable downtilt that allows the to-be-coordinated user equipment to have the greatest signal received power; or the setting unit is specifically configured to traverse all usable downtilts in the range of usable downtilts to find a usable downtilt that allows a greatest signal-to-leakage-and-noise ratio, and set the downtilt of the time-frequency resource block on the antenna of the local cell with respect to the to-be-coordinated user equipment to the usable downtilt that allows the greatest signal-to-leakage-and-noise ratio; or the setting unit is specifically configured to traverse all usable downtilts in the range of usable downtilts to find a usable downtilt that allows a greatest sum of signal-to-interference-plus-noise ratios, and set the downtilt of the time-frequency resource block on the antenna of the local cell with respect to the to-be-coordinated user equipment to the usable downtilt that allows the greatest sum of signal-to-interference-plus-noise ratios.

In addition, the apparatus further includes a coordinating module 303.

The coordinating module 303 includes a classifying unit, configured to classify user equipments within the service range of the local cell; and a first coordinating unit, configured to assign a time-frequency resource block on the antenna of the local cell to the to-be-coordinated user equipment according to the classification information of user equipments within the service range of the local cell based on a fractional frequency reuse FFR scheduling principle or a soft frequency reuse SFR scheduling principle; or a second coordinating unit, configured to assign a time-frequency resource block on the antenna of the local cell to the to-be-coordinated user equipment according to the classification information of user equipments within the service range of the local cell and the use probabilities, in the neighbor cell coordination information, of downtilts on each time-frequency resource block on the antenna of the neighbor cell based on a self-defined dynamic scheduling principle.

The classifying unit is specifically configured to classify user equipments within the service range of the local cell according to the optimal downtilt information, in the downtilt coordination information of the local cell, of time-frequency resource blocks on the antenna of the local cell with respect to user equipments within the service range of the local cell based on a pre-defined assignment rule; or the classifying unit is specifically configured to classify user equipments within the service range of the local cell according to the location information, in the downtilt coordination information of the local cell, of user equipments within the service range of the local cell.

By implementing the technical solutions of obtaining the downtilt coordination information of a local cell and the downtilt coordination information of a neighbor cell, and then setting, according to the downtilt coordination information of the local cell and the downtilt coordination information of the neighbor cell, a downtilt of a time-frequency resource block on the antenna of the local cell with respect to a to-be-coordinated user equipment, the downtilt coordination information of the local cell and that of the neighbor cell are referenced to for setting the downtilt of the time-frequency resource block on the antenna of the local cell with respect to the to-be-coordinated user equipment, which avoids interference on user equipments within a service range of the neighbor cell while ensuring signal received power and SINR experience for user equipments within a service range of the local cell.

All or part of content of the technical solutions provided by the foregoing embodiments may be implemented by software programming, where a software program is stored in a readable storage medium such as a hard disk, a CD-ROM, or a floppy disk of a computer.

The foregoing description is merely exemplary about the embodiments of the present invention, but is not intended to limit the present invention. Any modification, equivalent replacement, or improvement derived within the spirit and principle of the present invention shall fall within the protection range of the present invention.

What is claimed is:

1. A method for handling inter-cell interference, comprising:
    obtaining downtilt coordination information of a local cell and obtaining downtilt coordination information of a neighbor cell; and
    setting a downtilt of a time-frequency resource block on an antenna of the local cell with respect to a to-be-coordinated user equipment based on the obtained downtilt coordination information of the local cell and the obtained downtilt coordination information of the neighbor cell, and
    wherein a useable range comprising a plurality of downtilts of the downtilt for the time-frequency resource block on the antenna of the local cell with respect to the to-be-coordinated user equipment within a service range of the local cell is determined according to the downtilt coordination information of the local cell and the downtilt coordination information of the neighbor cell which comprises any one or more of the following:
    optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block on the base station of the cell is assigned to different user equipments, and downtilts not recommended for time-frequency resource blocks on an antenna of a neighboring cell.

2. The method according to claim 1, wherein the optimal downtilt information includes a direction of arrival parameter of the user equipment within the service range of the local cell that is obtained,
    wherein the direction of arrival parameter at least comprises downtilt information of a time-frequency resource block on the antenna of the local cell with respect to user equipments within the service range of the local cell, and the optimal downtilt information of the time-frequency resource block on the antenna of the local cell with respect to the user equipments within the service range of the local cell is determined according to the direction of arrival parameter.

3. The method according to claim 2, wherein the obtaining the direction of arrival parameter of the user equipment within the service range of the local cell comprises:
    transmitting channel state information reference signals of different direction of arrival parameters to the user equipment within the service range of the local cell on pilot resource elements within the time-frequency resource block on the antenna of the local cell, and receiving a direction of arrival parameter that is returned by the user equipment within the service range of the local cell and corresponding to a reference signal whose signal received strength measured on the reference signal is greater than a preset threshold; or
    transmitting reference signals to the user equipment within the service range of the local cell on pilot resource elements within the time-frequency resource block on the antenna of the local cell in a time division, frequency division, or code division mode; receiving a pre-code matrix of a channel state that is obtained by the user equipment within the service range of the local cell by estimation according to the reference signals; and obtaining the direction of arrival parameter of the user equipment within the service range of the local cell by estimation according to the pre-code matrix; or
    obtaining the direction of arrival parameter of the user equipment within the service range of the local cell by estimation according to an uplink channel quality measurement reference signal reported by the user equipment within the service range of the local cell.

4. The method according to claim 1, wherein obtaining location information of the user equipment within the service range of the local cell comprises:
    obtaining a direction of arrival parameter of the user equipment within the service range of the local cell by estimation according to an uplink channel quality measurement reference signal reported by the user equipment within the service range of the local cell,
    wherein the direction of arrival parameter at least comprises downtilt information of the time-frequency resource block on the antenna of the local cell with respect to user equipments within the service range of the cell; and obtaining the location information of the user equipment within the service range of the local cell by calculation according to the direction of arrival parameter; or
    receiving location information that is obtained by the user equipment within the service range of the local cell by performing positioning according to a predetermined positioning technology.

5. The method according to claim 1, wherein obtaining downtilts not recommended by the local cell for time-frequency resource blocks on the antenna of the neighboring cell comprises:

receiving downtilt information, reported by at least one user equipment served by the local cell, of a time-frequency resource block on an antenna of the neighbor cell with respect to the at least one user equipment, and selecting the downtilts not recommended by the local cell for time-frequency resource blocks on an antenna of a neighboring cell from the downtilt information of the time-frequency resource block on the antenna of the neighbor cell with respect to the at least one user equipment.

6. The method according to claim 1, wherein the obtaining the downtilt coordination information of the neighbor cell comprises:
   receiving the downtilt coordination information of the neighbor cell sent by the neighbor cell.

7. The method according to claim 1, wherein obtaining downtilts not recommended by the neighbor cell for time-frequency resource blocks on an antenna of a neighboring cell comprises:
   obtaining a direction of arrival parameter of a user equipment within a service range of the neighbor cell, wherein the direction of arrival parameter at least comprises downtilt information of a time-frequency resource block on the antenna of the local cell with respect to user equipments within the service range of the neighbor cell, and determining, according to the direction of arrival parameter, the downtilts not recommended by the neighbor cell for the time-frequency resource blocks on the antenna of the neighboring cell.

8. The method according to claim 7, wherein the obtaining the direction of arrival parameter of the user equipment within the service range of the neighbor cell comprises:
   transmitting channel state information reference signals of different direction of arrival parameters to the user equipment within the service range of the neighbor cell on pilot resource elements within the time-frequency resource block on the antenna of the local cell, and receiving a direction of arrival parameter that is returned by the user equipment within the service range of the neighbor cell and corresponding to a reference signal whose signal received strength measured on the reference signal is greater than a preset threshold; or
   transmitting reference signals to the user equipment within the service range of the neighbor cell on pilot resource elements within the time-frequency resource block on the antenna of the local cell in a time division, frequency division, or code division mode; receiving a pre-code matrix of a channel state obtained by the user equipment within the service range of the neighbor cell by estimation according to the reference signals; and obtaining the direction of arrival parameter of the user equipment within the service range of the neighbor cell by estimation according to the pre-code matrix; or
   obtaining the direction of arrival parameter of the user equipment within the service range of the antenna of the neighbor cell by estimation according to an uplink channel quality measurement reference signal reported by the user equipment within the service range of the antenna of the neighbor cell.

9. The method according to claim 1, wherein the setting, according to the downtilt coordination information of the local cell and the downtilt coordination information of the neighbor cell, the downtilt of the time-frequency resource block on the antenna of the local cell with respect to the to-be-coordinated user equipment comprises:
   determining a range of usable downtilts for time-frequency resource blocks on the antenna of the local cell with respect to user equipments within the service range of the local cell according to the downtilt coordination information of the local cell and the downtilt coordination information of the neighbor cell; and
   setting the downtilt of the time-frequency resource block on the antenna of the local cell with respect to the to-be-coordinated user equipment according to the range of usable downtilts based on a preset rule.

10. The method according to claim 9, wherein the determining the range of usable downtilts for the time-frequency resource blocks on the antenna of the local cell with respect to the user equipments within the service range of the local cell according to the downtilt coordination information of the local cell and the downtilt coordination information of the neighbor cell comprises:
   determining a range of optimal downtilts for the time-frequency resource blocks on the antenna of the local cell with respect to the user equipments within the service range of the local cell according to the optimal downtilt information, in the downtilt coordination information of the local cell, of the time-frequency resource blocks on the antenna of the local cell with respect to the user equipments within the service range of the local cell; and using a range of downtilts within the range of optimal downtilts, excluding downtilts which are in the downtilt coordination information of the neighbor cell and are not recommended for a neighboring cell, as the range of usable downtilts for the time-frequency resource blocks on the antenna of the local cell with respect to the user equipments within the service range of the local cell; or
   obtaining a distance between a base station of the local cell and a base station of the neighbor cell by calculation according to location information of the base station of the neighbor cell in the neighbor cell coordination information and location information of the base station of the local cell in the local cell coordination information, and obtaining the range of usable downtilts for the time-frequency resource blocks on the antenna of the local cell with respect to the user equipments within the service range of the local cell by calculation according to the distance and a vertical main beam width of the antenna of the local cell based on a geometrical relationship; or
   determining a range of optimal downtilts for the time-frequency resource blocks on the antenna of the local cell with respect to the user equipments within the service range of the local cell according to optimal downtilt information, in the downtilt coordination information of the local cell, of the time-frequency resource blocks on the antenna of the local cell with respect to the user equipments within the service range of the local cell; obtaining a set comprising neighbor cell downtilts whose use probabilities exceed a first threshold according to use probabilities, in the downtilt coordination information of the neighbor cell, of downtilts of the antenna of the neighbor cell on the time-frequency resource blocks; according to location information of the base station of the neighbor cell and location information of the base station of the local cell, calculating a downtilt set B of the antenna of the local cell with respect to geographical locations corresponding to the set comprising the neighbor cell downtilts; and using a range of downtilts within the range of optimal downtilts, excluding downtilts in the set B, as the range of usable downtilts for the time-frequency resource blocks on the antenna of the local cell with respect to the user equipments within the service range of the local cell; or determining a range of optimal downtilts for the time-frequency resource blocks on the antenna of the local cell with respect to the user equipments within the service range of the local cell according to optimal downtilt information, in the downtilt coordination information of the local cell, of the time-frequency resource blocks on the antenna of the local cell with respect to the user equipments within the service range of the local cell; according to location information, in the downtilt coordination information of the neighbor cell, of UEs within the service range of the neighbor cell and location information of the base station of the local cell, calculating a downtilt set C of the antenna of the local cell with respect to the location information of the UEs of the neighbor cell; or according to optimal downtilt information of the time-frequency resource blocks on the antenna of the neighbor cell with respect to user equipments within the service range of the neighbor cell and the location information of the base station of the neighbor cell, calculating geographical locations corresponding to the optimal downtilts, and according to the geographical locations corresponding to the optimal downtilts and the location information of the base station of the local cell, calculating a downtilt set C of the antenna of the local cell with respect to the geographical locations corresponding to the optimal downtilts; and using a range of downtilts within the range of optimal downtilts, excluding downtilts in the set C, as the range of usable downtilts for the time-frequency resource blocks on the antenna of the local cell with respect to the user equipments within the service range of the local cell; or determining a range of optimal downtilts for the time-frequency resource blocks on the antenna of the local cell with respect to the user equipments within the service range of the local cell according to optimal downtilt information, in the downtilt coordination information of the local cell, of the time-frequency resource blocks on the antenna of the local cell with respect to the user equipments within the service range of the local cell; according to probabilities, in the downtilt coordination information of the neighbor cell, that each time-frequency resource block on the base station of the neighbor cell is assigned to different user equipments, searching for a user equipment whose probability of being assigned with a time-frequency resource block of the neighbor cell is greater than a second threshold, and according to location information of the found UE and the location information of the base station of the local cell, calculating a downtilt set D of the antenna of the local cell with respect to the location information of the found UE; or according to optimal downtilt information of time-frequency resource blocks on the antenna of the neighbor cell with respect to the found UE and the location information of the base station of the neighbor cell, calculating geographical locations corresponding to the optimal downtilts, and according to the geographical locations corresponding to the optimal downtilts and the location information of the base station of the local cell, calculating a downtilt set D of the antenna of the local cell with respect to the geographical locations corresponding to the optimal downtilts; and using a range of downtilts within the range of optimal downtilts, excluding downtilts in the set D, as the range of usable downtilts for the time-frequency resource blocks on the antenna of the local cell with respect to the user equipments within the service range of the local cell.

11. The method according to claim 9, wherein the setting the downtilt of the time-frequency resource block on the antenna of the local cell with respect to the to-be-coordinated user equipment according to the range of usable downtilts based on the preset rule comprises:

obtaining optimal downtilt information of the to-be-coordinated user equipment from the optimal downtilt information, in the local cell coordination information, of time-frequency resource blocks on the antenna of the local cell with respect to the user equipments within the service range of the local cell; traversing all usable downtilts in the range of usable downtilts to find a usable downtilt that is closest to the optimal downtilt of the to-be-coordinated user equipment; and setting the downtilt of the time-frequency resource block on the antenna of the local cell with respect to the to-be-coordinated user equipment to the usable downtilt that is closest to the optimal downtilt of the to-be-coordinated user equipment; or traversing all usable downtilts in the range of usable downtilts to find a usable downtilt that allows the to-be-coordinated user equipment to have a greatest signal received power, and setting the downtilt of the time-frequency resource block on the antenna of the local cell with respect to the to-be-coordinated user equipment to the usable downtilt that allows the to-be-coordinated user equipment to have the greatest signal received power; or traversing all usable downtilts in the range of usable downtilts to find a usable downtilt that allows a greatest signal-to-leakage-and-noise ratio, and setting the downtilt of the time-frequency resource block on the antenna of the local cell with respect to the to-be-coordinated user equipment to the usable downtilt that allows the greatest signal-to-leakage-and-noise ratio; or traversing all usable downtilts in the range of usable downtilts to find a usable downtilt that allows a greatest sum of signal-to-interference-plus-noise ratios, and setting the downtilt of the time-frequency resource block on the antenna of the local cell with respect to the to-be-coordinated user equipment to the usable downtilt that allows the greatest sum of signal-to-interference-plus-noise ratios.

12. The method according to claim 1, further comprising:

classifying user equipments within the service range of the local cell, and assigning a time-frequency resource block on the antenna of the local cell to the to-be-coordinated user equipment according to the classification information of user equipments within the service range of the local cell, based on a fractional frequency reuse FFR scheduling principle or a soft frequency reuse SFR scheduling principle; or classifying user equipments within the service range of the local cell, and assigning a time-frequency resource block on the antenna of the local cell to the to-be-coordinated user equipment according to the classification information of user equipments within the service range of the local cell and the use probabilities, in the neighbor cell coordination information, of downtilts on each time-frequency resource block on the antenna of the neighbor cell, based on a self-defined dynamic scheduling principle.

13. The method according to claim 12, wherein the classifying user equipments within the service range of the local cell comprises:
- classifying the user equipments within the service range of the local cell according to the optimal downtilt information, in the downtilt coordination information of the local cell, of the time-frequency resource blocks on the antenna of the local cell with respect to the user equipments within the service range of the local cell, based on a pre-defined assignment rule; or
- classifying the user equipments within the service range of the local cell according to the location information, in the downtilt coordination information of the local cell, of the user equipments within the service range of the local cell.

14. An apparatus for handling inter-cell interference, comprising:
- at least one memory that stores instructions; and
- at least one processor configured to execute the instructions to:
- obtain downtilt coordination information of a local cell and obtain downtilt coordination information of a neighbor cell;
- set a downtilt of a time-frequency resource block on the antenna of the local cell with respect to a to-be-coordinated user equipment based on the obtained downtilt coordination information of the local cell and the obtained downtilt coordination information of the neighbor cell obtained, and
- wherein a useable range comprising a plurality of downtilts of the downtilt for the time-frequency resource block on the antenna of the local cell with respect to the to-be-coordinated user equipment within a service range of the local cell is determined according to either downtilt coordination information of the downtilt coordination information of the local cell and the downtilt coordination information of the neighbor cell which comprises one or more of the following:
- optimal downtilt information of time-frequency resource blocks on an antenna of a cell with respect to user equipments within a service range of the cell, location information of user equipments within the service range of the cell, location information of a base station of the cell, use probabilities of downtilts on each time-frequency resource block on the antenna of the cell, probabilities that each time-frequency resource block on the base station of the cell is assigned to different user equipments, and downtilts not recommended for time-frequency resource blocks on an antenna of a neighboring cell.

15. The apparatus according to claim 14, wherein the obtaining of the downtilt coordination information of the local cell and the downtilt coordination information of the neighbor cell comprises:
- obtaining a direction of arrival parameter of a user equipment within a service range of the local cell, wherein the direction of arrival parameter at least comprises downtilt information of a time-frequency resource block on the antenna of the local cell with respect to user equipments within the service range of the local cell; and
- determining, according to the direction of arrival parameter obtained, optimal downtilt information of the time-frequency resource block on the antenna of the local cell with respect to user equipments within the service range of the local cell.

16. The apparatus according to claim 15, wherein channel state information reference signals of different direction of arrival parameters are transmitted to the user equipment within the service range of the local cell on pilot resource elements within the time-frequency resource block on the antenna of the local cell, and receive a direction of arrival parameter that is returned by the user equipment within the service range of the local cell and corresponding to a reference signal whose signal received strength measured on the reference signal is greater than a preset threshold; or
- reference signals are transmitted to the user equipment within the service range of the local cell on pilot resource elements within the time-frequency resource block on the antenna of the local cell in a time division, frequency division, or code division mode; receive a pre-code matrix of a channel state that is obtained by the user equipment within the service range of the local cell by estimation according to the reference signals; and obtain the direction of arrival parameter of the user equipment within the service range of the local cell by estimation according to the pre-code matrix; or
- the direction of arrival parameter of the user equipment within the service range of the local cell is obtained by estimation according to an uplink channel quality measurement reference signal reported by the user equipment within the service range of the local cell.

17. The apparatus according to claim 14, wherein the obtaining of the downtilt coordination information of the local cell and the downtilt coordination information of the neighbor cell comprises:
- obtaining the direction of arrival parameter of the user equipment within the service range of the local cell by estimation according to the uplink channel quality measurement reference signal reported by the user equipment within the service range of the local cell, wherein the direction of arrival parameter at least comprises downtilt information of the time-frequency resource block on the antenna of the local cell with respect to user equipments within the service range of the cell; and obtain location information of the user equipment within the service range of the local cell by calculation according to the direction of arrival parameter; or
- receiving location information that is obtained by the user equipment within the service range of the local cell by performing positioning according to a predetermined positioning technology.

18. The apparatus according to claim 14, wherein the obtaining of the downtilt coordination information of the local cell and the downtilt coordination information of the neighbor cell comprises:
- receiving downtilt information, reported by at least one user equipment served by the local cell, of a time-frequency resource block on an antenna of the neighbor cell with respect to the at least one user equipment, and select downtilts not recommended by the local cell for time-frequency resource blocks on an antenna of a neighboring cell from the downtilt information of the time-frequency resource block on the antenna of the neighbor cell with respect to the at least one user equipment.

19. The apparatus according to claim 14, wherein the obtaining of the downtilt coordination information of the local cell and the downtilt coordination information of the neighbor cell comprises:
- receiving the downtilt coordination information of the neighbor cell sent by the neighbor cell.

20. The apparatus according to claim 14, wherein the obtaining of the downtilt coordination information of the local cell and the downtilt coordination information of the neighbor cell comprises:

obtaining a direction of arrival parameter of a user equipment within a service range of the neighbor cell, wherein the direction of arrival parameter at least comprises downtilt information of a time-frequency resource block on the antenna of the neighbor cell with respect to user equipments within the service range of the neighbor cell, and determine optimal downtilt information of the time-frequency resource block on the antenna of the neighbor cell with respect to user equipments within the service range of the neighbor cell according to the direction of arrival parameter.

* * * * *